US007963378B2

(12) United States Patent
Glance et al.

(10) Patent No.: US 7,963,378 B2
(45) Date of Patent: Jun. 21, 2011

(54) CORRUGATED TUBULAR ENERGY ABSORBING STRUCTURE

(75) Inventors: Paul C. Glance, Troy, MI (US); Sidney T. Winter, Richmond, MI (US); Robert J. Bauer, Dearborn Heights, MI (US); Eddy R. Finch, Murfreesboro, TN (US); Bryant A. Tokarz, Franklin, TN (US)

(73) Assignee: O-Flex Group, Inc., Murfreesboro, TN (US)

( * ) Notice: Subject to any disclaimer, the term of this patent is extended or adjusted under 35 U.S.C. 154(b) by 426 days.

(21) Appl. No.: 11/670,115

(22) Filed: Feb. 1, 2007

(65) Prior Publication Data

US 2008/0036242 A1    Feb. 14, 2008

Related U.S. Application Data

(60) Provisional application No. 60/836,681, filed on Aug. 10, 2006.

(51) Int. Cl.
*F16F 7/12* (2006.01)
(52) U.S. Cl. .................. 188/377; 296/35.2; 293/109
(58) Field of Classification Search .............. 188/371, 188/376, 377; 267/136, 139; 138/121, 122, 138/129, 132–134, 137, 177, 178; 296/35.2, 296/146.7, 187.01, 187.05; 293/102, 104, 293/107, 108, 109, 110
See application file for complete search history.

(56) References Cited

U.S. PATENT DOCUMENTS

| 3,794,364 | A | * | 2/1974 | Williams ...................... 285/390 |
| 3,829,149 | A |   | 8/1974 | Stevens |
| 3,888,502 | A |   | 6/1975 | Felzer et al. |
| 4,531,619 | A |   | 7/1985 | Eckels |
| 4,793,384 | A | * | 12/1988 | Lalikos et al. .................. 138/121 |
| 4,877,224 | A |   | 10/1989 | Watts |
| 4,978,562 | A |   | 12/1990 | Wycech |
| 5,033,593 | A |   | 7/1991 | Kazuhito |
| 5,325,893 | A | * | 7/1994 | Takagi et al. .................. 138/143 |
| 5,382,051 | A |   | 1/1995 | Glance |
| 5,680,886 | A |   | 10/1997 | Ohtsuka |
| 5,914,163 | A |   | 6/1999 | Browne |

(Continued)

FOREIGN PATENT DOCUMENTS

DE    19814842    7/1999

(Continued)

OTHER PUBLICATIONS

EPO Search Report for European Patent No. 1892159 (Application No. 07114211.1) dated Jan. 25, 2008 (8 pages).

(Continued)

*Primary Examiner* — Pam Rodriguez
(74) *Attorney, Agent, or Firm* — Waddey & Patterson; Mark J. Patterson; Matthew C. Cox

(57) ABSTRACT

An energy absorbing tubular structure is formed of a molded or extruded polymer. The tube has a quadrangular cross-section with rounded corners. The walls of tube are corrugated with alternating convex and concave corrugations surfaces having a continuous constant radius, preferably with no flat spots. The corrugated walls have a constant thickness. The corrugations progressively deform during impact thereby providing a near perfect square wave force vs. deflection energy absorption curve at any predetermined nearly constant force level. The tube may be filled with polymer foam to vary the impact performance of the structure.

30 Claims, 14 Drawing Sheets

U.S. PATENT DOCUMENTS

| | | |
|---|---|---|
| 6,092,555 A | 7/2000 | Otsuka |
| 6,123,616 A | 9/2000 | Otsuka |
| 6,199,941 B1 | 3/2001 | Takahara et al. |
| 6,293,614 B1 | 9/2001 | Takahara et al. |
| 6,296,301 B1 | 10/2001 | Schroeder et al. |
| 6,378,933 B1 | 4/2002 | Schoen et al. |
| 6,435,601 B2 | 8/2002 | Takahara |
| 6,619,328 B2 | 9/2003 | Otsuka |
| 6,679,540 B1 | 1/2004 | Graber et al. |
| 6,705,669 B1 | 3/2004 | Pearcy et al. |
| 7,077,460 B2 | 7/2006 | Czaplicki et al. |
| 2004/0060790 A1 | 4/2004 | Wu |
| 2004/0140169 A1 | 7/2004 | Shimoda |

FOREIGN PATENT DOCUMENTS

| | | |
|---|---|---|
| EP | 0888952 | 1/1999 |
| EP | 0955227 | 11/1999 |
| EP | 1679234 | 7/2006 |
| EP | 1892159 | 2/2008 |

OTHER PUBLICATIONS

EPO Office Action for European Patent No. 1892159 (Application No. 07114211.1) dated Nov. 6, 2008 (5 pages).

EPO Office Action Response for European Patent No. 1892159 (Application No. 07114211.1) dated May 18, 2009 (3 pages).

* cited by examiner

CORRUGATED TUBULAR ENERGY ABSORBING STRUCTURE

CROSS-REFERENCES TO RELATED APPLICATIONS

This application is a non-provisional application which claims benefit of U.S. Patent Application Ser. No. 60/836,681 filed Aug. 10, 2006, entitled "AUTOMOTIVE TUBULAR ENERGY ABSORBER" which is hereby incorporated by reference.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention generally relates to structures used to absorb energy from impact forces applied to the exterior and interior components of motor vehicles. More particularly, this invention pertains to tubular energy absorbing structures that can provide a substantially constant reaction force by progressively deforming and absorbing energy during impact.

The Federal Motor Vehicle Safety Standards (FMVSS) impose performance requirements on automobile bumpers to minimize vehicle damage and on interior trim components to lower the risk of occupant injury caused by vehicle impact. To meet these requirements, automobile manufactures use energy absorbing structures in combination with exterior and interior vehicle components. These structures should be simple, have a low profile, and should be light in weight so as not to significantly affect vehicle performance and fuel consumption. Typical exterior and interior applications for energy absorbing structures in vehicles are identified by locations P in FIG. 11.

Conventional impact energy absorbing structures have included foam structures and flexible tubes having corrugated walls made from laminations of paper, fiber, plastic and/or metal. The tube absorbs energy when the walls of the tube deform in response to external impact forces. Examples of such structures are described in U.S. Pat. Nos. 6,092,555 and 5,680,886, the disclosures of which are incorporated herein by reference. The laminated or layered wall structure can provide enhanced vibration dampening. One example of a prior art wound or spin formed energy absorbing flexible tube is shown in FIGS. 1-3. FIG. 3 is an enlarged view of a wall section, showing inner and outer kraft paper layers 2 with a central metal layer 3.

Unfortunately, prior art tubular structures have not been optimally efficient in absorbing energy produced by external impacts to the vehicle. In this context, the efficiency of energy absorption is determined by analysis of the square wave force (or acceleration) vs. deflection curve. The actual energy absorbed by the tube is represented by the area under force vs. deflection curve. The efficiency of energy absorption is then calculated by dividing the actual energy absorbed by a perfect square or rectangular area, calculated as peak force time vs. deflection.

Ideally, the energy absorbing structure should provide a constant reaction force during impact, i.e., square wave force vs. deflection. In the case of a tubular energy absorbing structure, this means that stresses in the tube walls should be uniform and the tube should uniformly progressively deform ("stroke") during impact and energy absorption. Unfortunately, prior art tubular structures have not provided a methodology for achieving ideal energy absorbing characteristics.

Energy absorbing structures used in or on motor vehicles should also be easily packaged for shipment and storage, be able to function as a low cost spacer between vehicle fascia covers/trim components and the vehicle body structure and/or have integral fasteners for snap fit attachment to interior vehicle components. Prior art energy absorbing structures cannot provide all of these attributes in combination.

BRIEF SUMMARY OF THE INVENTION

It is an object of the present invention to provide a tubular stroking energy absorbing structure which can efficiently absorb impact energy during impact at nearly constant force levels; can function as a low cost spacer in vehicle exterior applications; can incorporate a low cost push snap attachment device for vehicle interior applications; provide high vibration and noise damping, and provide consistent impact performance over a wide range of temperatures and environmental conditions.

Thus, the energy absorbing structure of present invention is a closed section polygonal tube having at least one corrugated side wall extending along the length of the tube. The corrugations in the side wall have a continuous constant radius preferably with no flat spots, but with no more than two flat spots per corrugation. The corrugations are preferably defined by a series of interconnected alternating convex and concave radial corrugation surfaces. The walls are made of a material having a material thickness such that the corrugations uniformly progressively deform in response to an impact force applied to the structure.

In one embodiment, the energy absorbing structure is a tube made of a molded or extruded polymer, such as high density polyethylene (HDPE). The tube has a substantially quadrangular cross-section with four corrugated walls and rounded corners. The corrugations on each of the side walls are aligned transverse to the length of the tube. Optionally, the interior of the tube can be filled (or partially filled) with foam of different densities to vary the impact performance of the structure.

In another embodiment, the energy absorbing structure includes one or more fasteners attached to (or formed integral with) at least one of the corrugated side walls. A projecting portion of the fastener is adapted for snap fit attachment of the energy absorbing structure to a motor vehicle interior trim piece or exterior fascia component.

In yet another embodiment, an energy absorbing tube is combined with a trim component used in the passenger compartment of a motor vehicle. A first end of the tube is attached to an interior surface of the trim component wall. The second end of the tube projects away from the trim component wall. A trim mounting clip is attached to the second end of the tube. The tube has four corrugated side walls defining a rectangular cross-section. Each of the corrugated side walls of the tube has a series of interconnected corrugations. Each of the corrugations has a corrugation geometry defining a continuous series of alternating convex and concave radial corrugation surfaces aligned transversely across the side walls. The corrugations are progressively deformable in response to an impact force applied to the exterior surface of the trim component.

In another embodiment, the invention is a device for absorbing energy from an impact force applied to a motor vehicle. An elongated tube is formed of a molded or extruded polymer such as HDPE. The tube has four corrugated walls and a rectangular cross-section. The tube is positioned in the motor vehicle to receive an axial impact force. The corrugated walls have corrugations defined by a series of alternating convex and concave radial corrugation surfaces aligned transversely to the tube axis. The corrugations are further defined by corrugation parameters selected such that the energy absorbing device provides a substantially constant reaction force in response to an axial impact force, by uniform progressive deformation of the corrugations. The selected corrugation parameters define corrugations having a constant continuous radius with no flat sections.

Preferably, the selected corrugation parameters include longer and shorter outside dimensions L and W defined by the convex radial corrugation surfaces, and wherein L and W define a tube aspect ratio that is less than or equal to 2.0. The selected corrugation parameters further include convex and concave radial corrugation surfaces having a radius R. The shorter outside dimension W of the tube cross-section is defined by N*R, where N is an integer. The selected corrugation parameters also preferably include successive aligned convex radial corrugation surfaces on the side walls separated by a nominal distance substantially equal to 4*R. In this embodiment, the corrugated side walls preferably have a uniform material thickness and the concave radial corrugation surfaces have a radius substantially equal to the radius of the convex radial corrugation surfaces, thereby defining a nominal corrugation depth equal to 2*R.

The present invention also includes a method of designing a tube for efficiently absorbing impact energy in response to a constant impact force applied to a motor vehicle. The method begins with selecting a tube having a hollow interior and a substantially quadrangular cross-section defined by a longer outer dimension L and a shorter outer dimension W. The tube is provided with four corrugated side walls of substantially constant material thickness t, each of the side walls having rounded corners. The nominal and maximum tube dimensions for L and W are determined in accordance with space available in the location in the motor vehicle where the tube is to be placed. The energy absorbing stroke distance is then predicted such that the tube will absorb all of the impact energy within a 90% or less deformation of the tube. One of the dimensions L and W is selected to correspond to the predicted stroke distance. The other of the dimensions L and W is selected so that the aspect ratio L/W is approximately less than or equal to 2.0. Each of the corrugated walls is provided with a series of interconnected transverse convex and concave corrugations having a constant continuous corrugation radius R, preferably with no flat sections. The corrugation radius R is selected such that the shorter tube dimension W is equal N*R, where N is an integer. Preferably, the corrugated wall material is selected so that it is capable of greater than 100% elongation to break. The energy absorbing efficiency of the tube can be optimized by computer modeling of tube deformation over time in response to one or more impact forces. The computer modeling preferably includes iterating values for wall material thickness and corrugation geometry.

Optionally, the design method can include adjusting the response of the tube to different magnitudes of impact forces by providing at least a portion of the interior of the tube with a volume of polymer foam and adjusting the volume of the foam and the foam density for different constant force levels.

The novel energy absorbing structure of the present invention has application to vehicle interiors, exteriors, and bumpers by providing very efficient (square wave force vs. deflection) energy absorption during impact at a nearly constant force level. These structures are capable of providing a "soft" peak pedestrian knee acceleration of less than 150 G when impacted at 40 KMH with the European Union (EU) lower leg form test fixture. The structures also incorporate a high level of vibration/noise damping. In motor vehicle applications, an energy absorbing structure of the present invention can function as a low cost spacer between vehicle fascia covers and vehicle body structure and as a low cost snap fit attachment device for interior trim applications. The invention has specific application to vehicle bumper systems which must meet the FMVSS 2.5 and 5 mph impact test standards, the EU pedestrian lower leg form 40 KMH test requirements, and the FMVSS 201 u head impact test standards. The corrugated walls progressively deform (stroke) during impact thereby providing a near perfect square wave force vs. deflection energy absorption curve at any predetermined force level, which is a function of the corrugated wall geometry, wall thickness, and wall material.

DETAILED DESCRIPTION OF THE INVENTION

A preferred embodiment of the energy absorbing structure of the present invention is shown FIGS. 4-8. The basic structure is a closed section polygonal, circular, or substantially quadrangular tube. In the embodiment of FIGS. 4-8, the tube 10 has a substantially quadrangular cross-section defined by four side walls 15a-d and a hollow interior 20. As shown on FIGS. 5 and 6, for design and modeling purposes, the tube 10 has a length E that is determined by the space available in the particular energy absorbing application. The rectangular cross-section of the tube is defined by a longer outer dimension L and a shorter outer dimension W. The aspect ratio of the tube 10 can therefore be represented by L/W.

Figure 5:
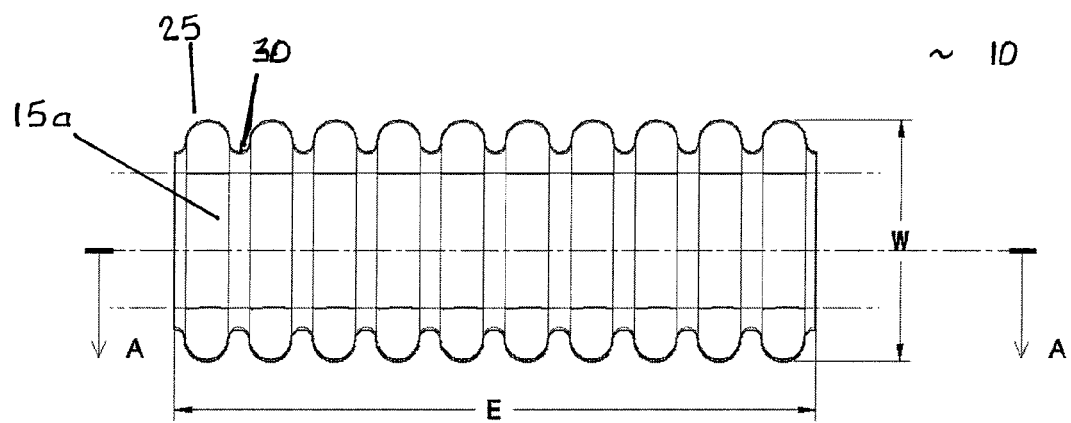
FIG. 5 is a side view of the energy absorbing structure of FIG. 4.
Figure 6:
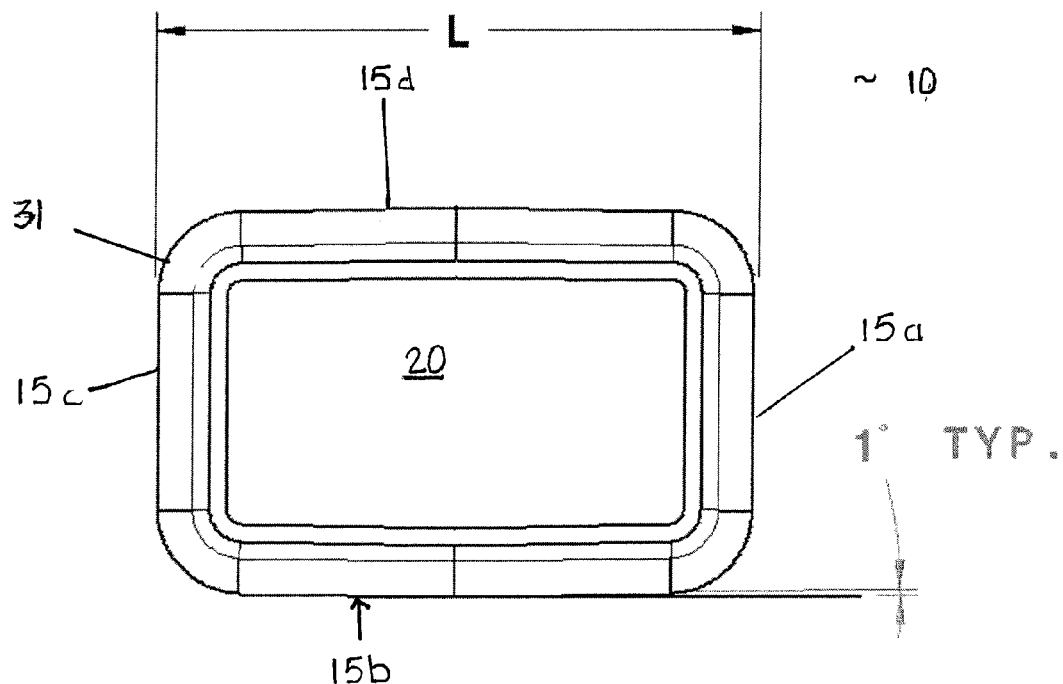
FIG. 6 is an end view of the energy absorbing structure of FIG. 4.
Figure 7:
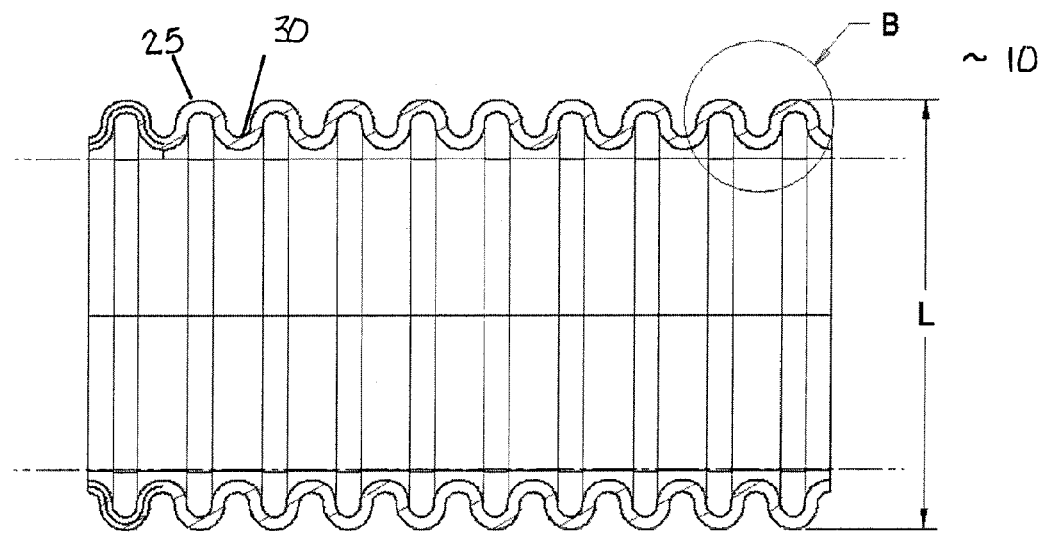
FIG. 7 is a cross-sectional view of the of the energy absorbing structure of FIG. 4.
Figure 8:
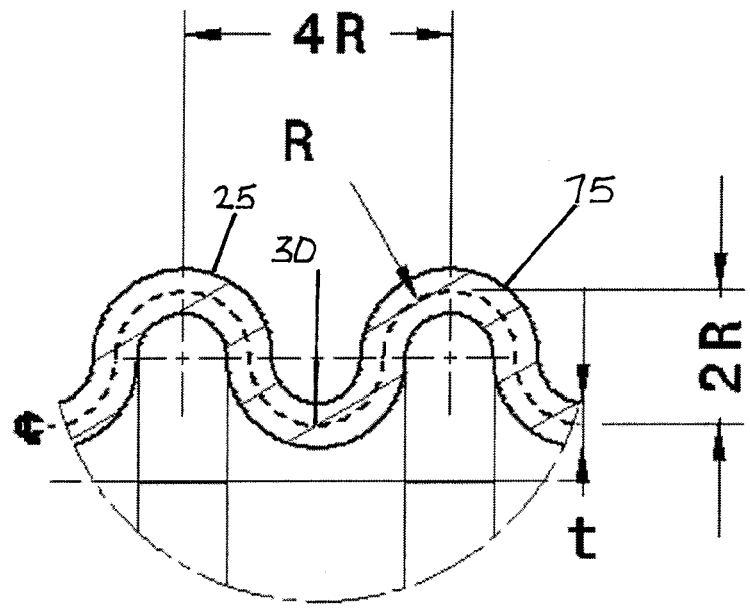
FIG. 8 is a cross-sectional view of the corrugated wall portion (B) of the energy absorbing structure of FIGS. 4 and 7.

In this embodiment, each of the side walls 15a-d is corrugated with rounded corners 31. As best seen in FIGS. 5, 7, and 8, the side walls 15a-d have a preferred corrugation geometry in which the corrugations have a continuous constant radius R with no intervening flat spots. Thus, the corrugations are preferably a series of interconnected alternating convex and concave radial corrugation surfaces 25 and 30. In this embodiment, the corrugation surfaces 25 and 30 are aligned along the surface of the walls 15a-d, transverse to the length E of the tube 10.

As shown in FIG. 8, in a preferred embodiment, the tube 10 is optimized for efficient energy absorption by providing a substantially constant wall thickness t and a preferred corrugation geometry. This results in a uniform distribution of stresses in the tube walls and corrugations that in turn provide a substantially constant reaction force in response to the impact force. Therefore, the corrugations uniformly and progressively deform in response to an impact force applied to the tube. In accordance with this preferred corrugation geometry, the outside dimension W of the tube cross-section is defined by N*R, where N is an integer. As best seen in FIG. 8, the successive aligned convex radial corrugation surfaces 25 on the side walls 15a-b are separated by a nominal distance substantially equal to 4*R. The concave radial corrugation surfaces 30 have a radius substantially equal to the radius of the convex radial corrugation surfaces 25, thereby defining a nominal corrugation depth equal to 2*R. Also, testing and modeling of tubular energy structures as shown in FIGS. 4-8 have shown that a preferred tube aspect ratio L/W should be substantially in the range of 1.0 to 2.0. If the aspect ratio is greater than 2.0, or in some applications greater than 1.5, the tube 10 may become unstable under load.

Preferably, the tube 10 will be fabricated via molding or extruding a polymer, such as extruded HDPE or metal such as aluminum.

Figure 25:
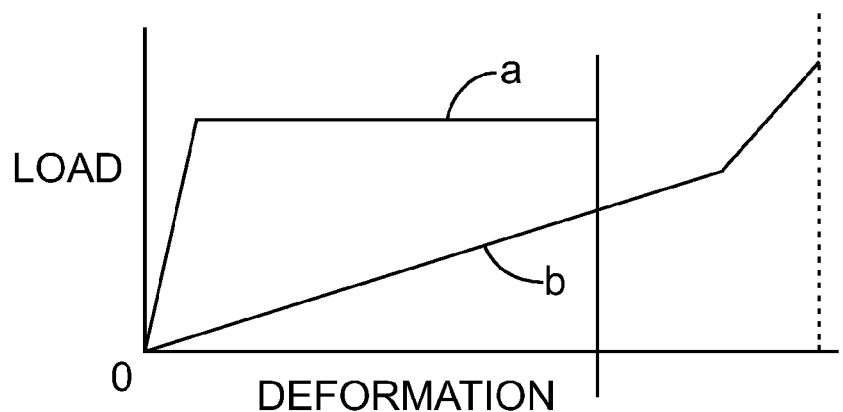
FIG. 25 illustrates a graph of an embodiment of a force versus deflection curve.

When the energy absorbing tube 10 is configured as described herein, the energy absorbing efficiency of the structure is optimized as shown in the force-deformation curve seen in FIG. 25. The force applied to the tube is represented by the vertical axis. The horizontal axis shows deformation of the tube as a function of distance traveled by the impactor in the direction of load application. The area under the force vs. deflection curve therefore represents the actual energy absorbed by the structure. Curve (a) on the graph represents the impact energy absorbing performance of a tube designed in accordance with the present invention and shows a preferred square wave force response. By comparison, curve (b) represents the impact energy absorbing performance of a typical foam structure as used in the prior art. The energy absorbed (area under the curve) is the same but the energy absorbing performance represented by curve (a) is superior to that represented by curve (b) because of the lower peak force and shorter stroke.

Figure 26:
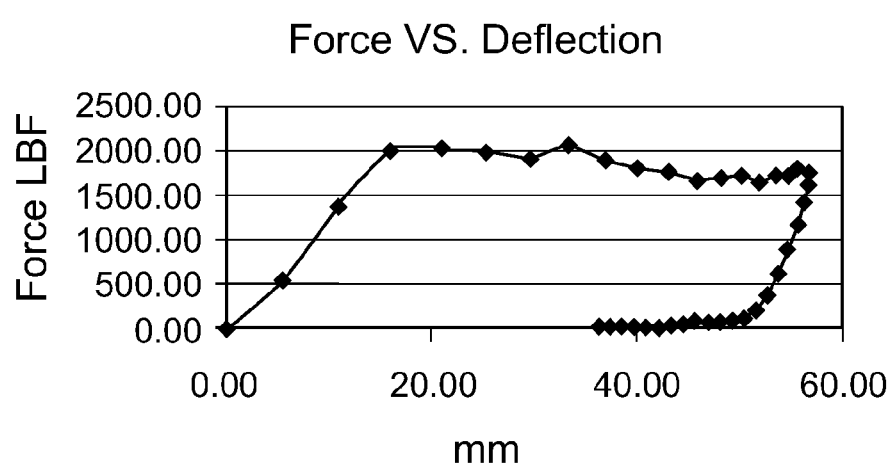
FIG. 26 illustrates a graph of an embodiment of a theoretical force versus deflection curve.

The optimal energy absorbing performance of the tube 10 as described herein is obtained by a providing a constant reaction force through uniform and progressive deformation of the corrugations in the tube side walls 15a-d. This is demonstrated by simulated bench testing of an HDPE tube using a pedestrian leg form that impacts a rectangular tube 10 having four corrugated side walls with optimized wall thickness and corrugation geometry. The graph in FIG. 26 shows a predicted force vs. deformation performance for the tube during the bench test.

Figure 22A:
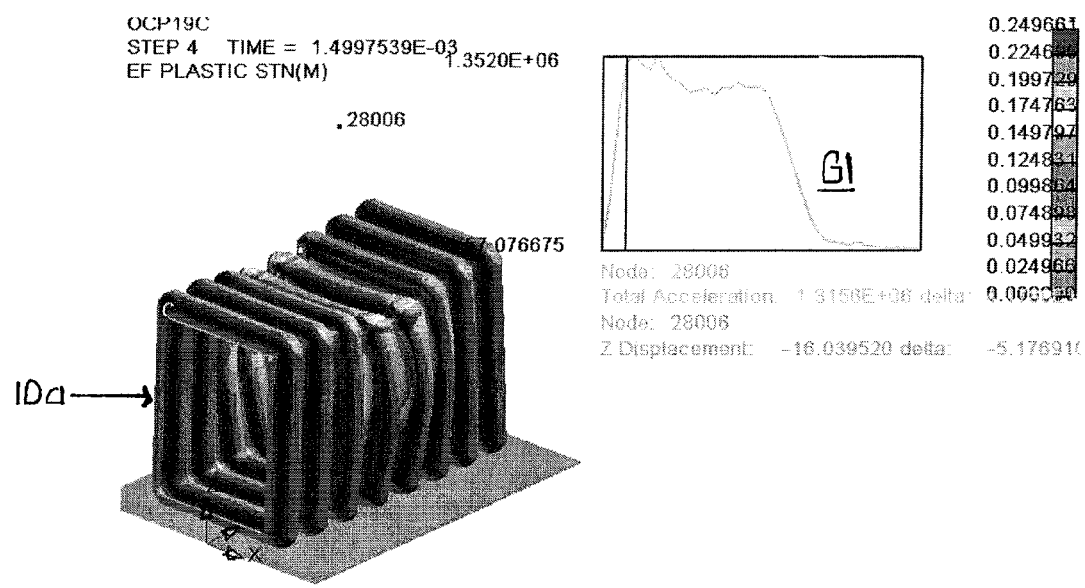
FIG. 22a illustrates the results (at time step 4) of a computer simulation of the impact performance of the corrugated tubular energy absorbing structure of the present invention.
Figure 22B:
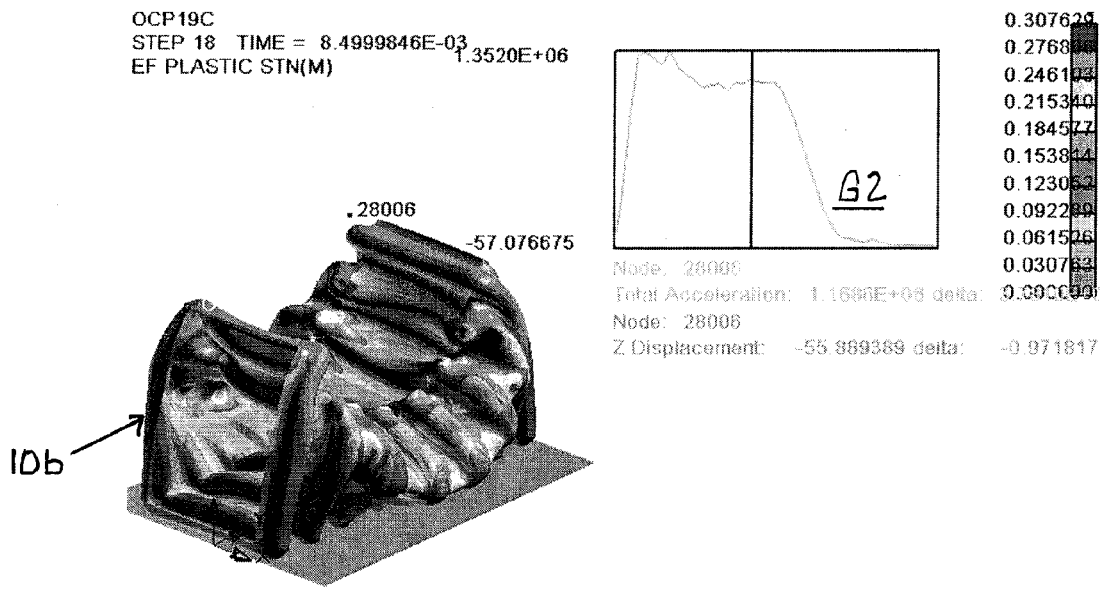
FIG. 22b illustrates the results (at time step 18) of a computer simulation of the impact performance of the corrugated tubular energy absorbing structure of the present invention.

The results of the simulated bench test are shown in FIGS. 22a and 22b. The image of the tube at 10a shows initial progressive deformation of the corrugations at time step 4. The corresponding graph G1 in FIG. 22a shows the acceleration vs. time curve also at time step 4. The image of the tube at 10b in FIG. 22b shows further progressive deformation of the corrugations at time step 18. The corresponding graph G2 shows the acceleration vs. time curve also at time step 18. From the predicted and modeled performance data, a person of skill in the art will recognize the superior energy absorption results are achieved by the corrugated tubular structure of the present invention.

Figure 24:
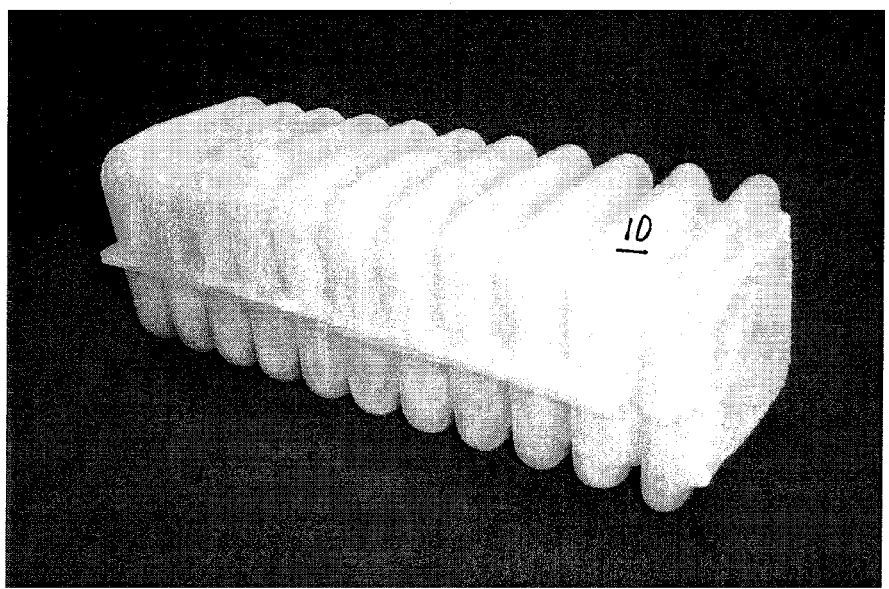
FIG. 24 is a perspective view of a tested embodiment of the corrugated tubular energy absorbing structure of the present invention, having an 8×8 mm corrugated tube formed of HDPE material with a 70×60 mm rectangular cross-section, and filled with urethane foam at a density of 2.0 pounds per cubic foot.
Figure 27:
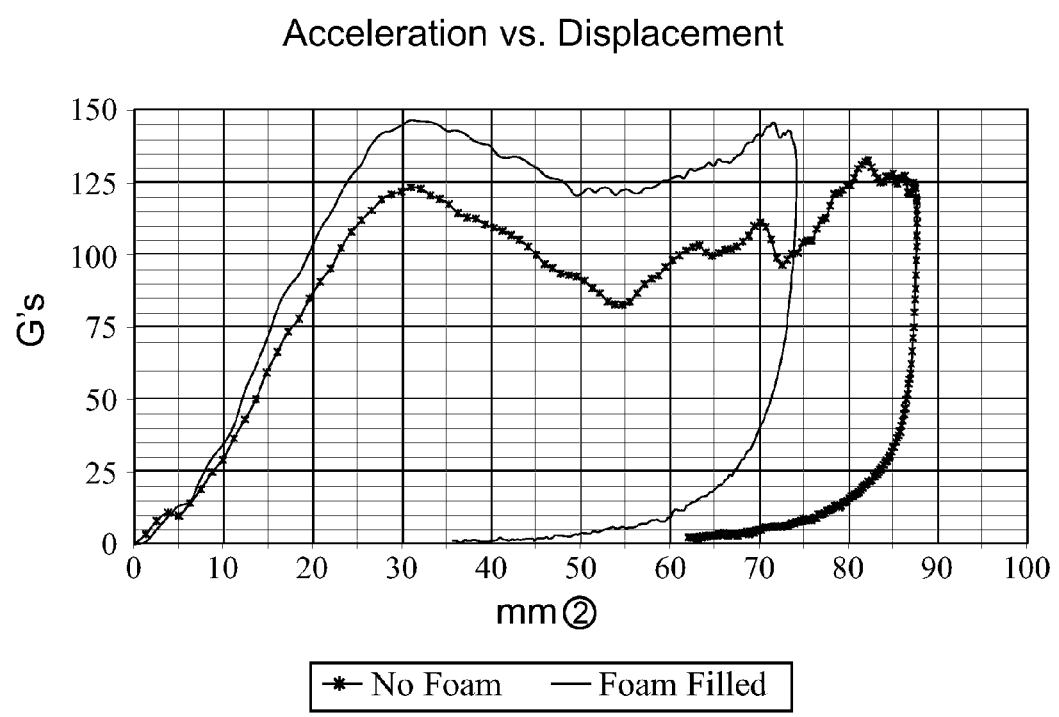
FIG. 27 illustrates a graph of an embodiment of measured force versus deflections curves corresponding to various foam-filled and no-foam-filled embodiments of energy absorbing structures in accordance with the present invention.

In some applications for a tubular energy absorbing structure, it is advantageous to provide a range of constant reaction force levels so that the same basic structure can meet a range of different impact requirements and vehicle applications. This can be accomplished by partially or completely filling the interior 20 of the tube 10 with polymer foam. By adjusting the volume and/or density of the foam, the reaction force levels and in some cases the efficiency of energy absorption provided the tube can be varied. The graph in FIG. 27 shows actual tested force vs. deformation of a typical corrugated side wall tubular structure 10 as shown in FIG. 24. The tested structure was an 8×8 mm corrugated HDPE tube having a 70×60 mm rectangular cross-section. The wall thickness was 1.5 mm. In the "no foam" test, the interior 20 of the tube 10 was empty. In the "foam filled" test, a tube of identical construction was filled with urethane foam at a density of 2.0 pounds per cubic foot.

The test shows the efficacy of changing the reaction force of the tube by adding foam while maintaining an optimized energy absorbing performance.

Figure 9:
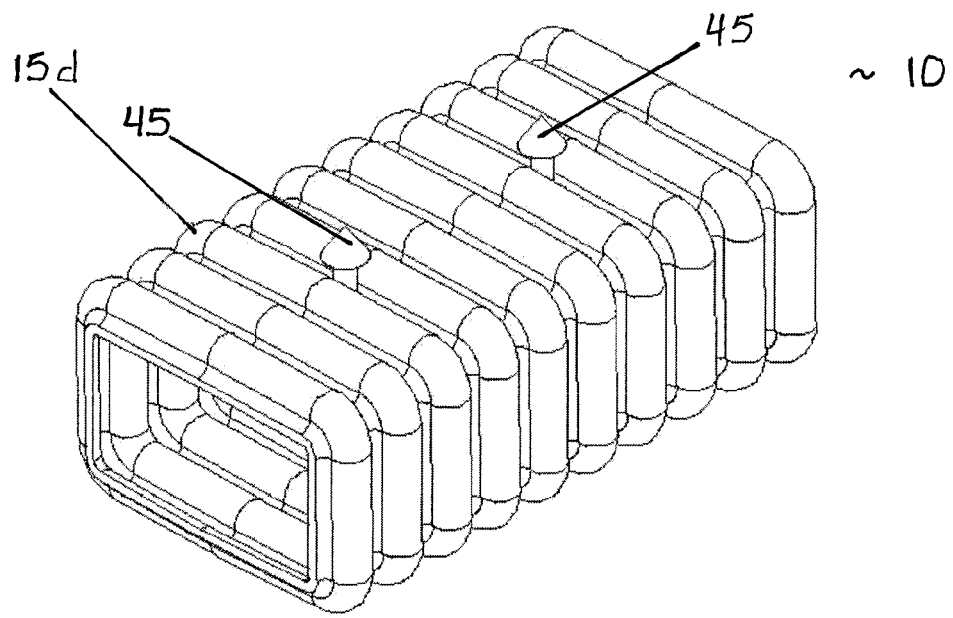
FIG. 9 is an isometric view of an embodiment of the corrugated tubular energy absorbing structure of the present invention, having an integral fastener.
Figure 10:
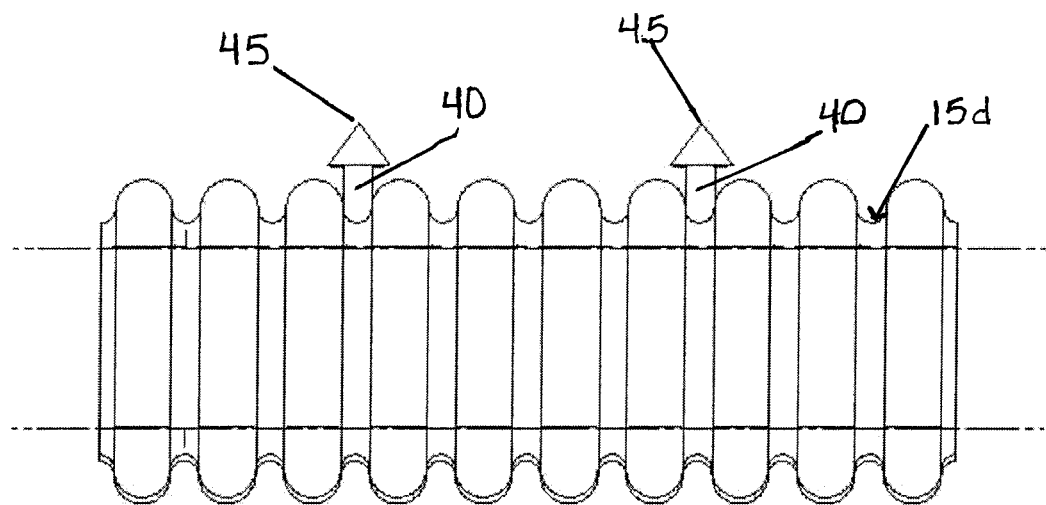
FIG. 10 is a side view of the embodiment of the energy absorbing structure of FIG. 9.

FIGS. 9-10 show another embodiment of the tube 10 of the present invention that has been specifically adapted for direct attachment to a motor vehicle, such as to a vehicle trim or fascia component. Thus, in this embodiment, a pair of fasteners 40 are attached to, or formed integral with, the tube 10 with a projecting portion 45 extending laterally away from one wall 15d. The precise location, size and shape of the projecting portion 45 are configured so that the tube fasteners 40 can be snapped into corresponding connection points located on the vehicle structure.

Figure 11:
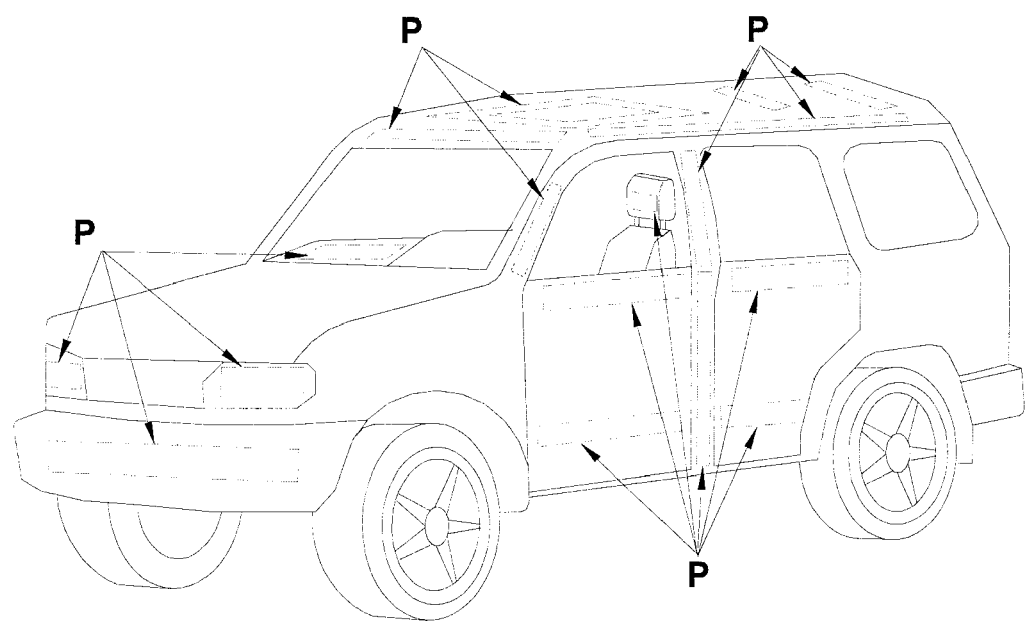
FIG. 11 is an isometric view of a motor vehicle showing the locations of potential application of energy absorbing structures in accordance with the present invention.
Figure 12:
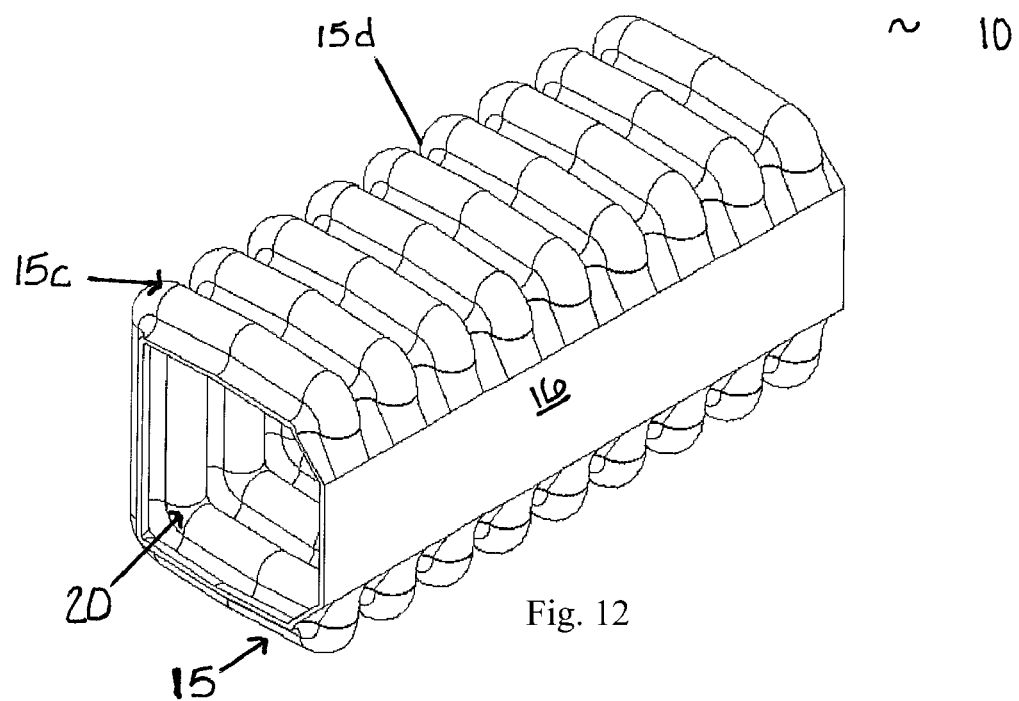
FIG. 12 is an isometric view of another embodiment of the corrugated tubular energy absorbing structure of the present invention having three corrugated walls.
Figure 13:
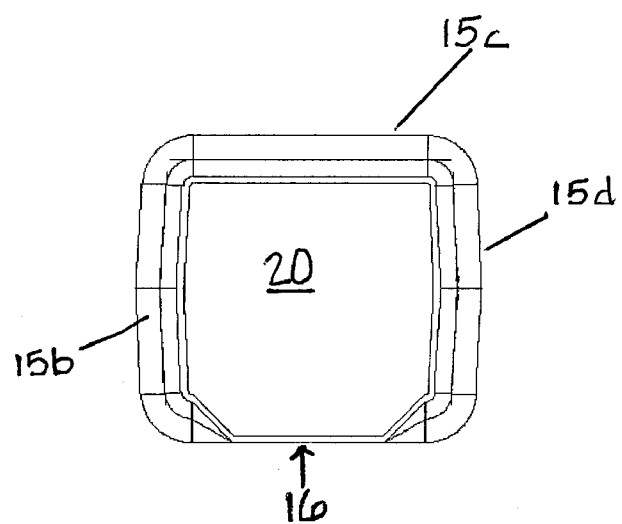
FIG. 13 is an end view of the three-wall embodiment of the energy absorbing structure shown in FIG. 12.

FIGS. 12-13 show another embodiment of a tube 10 in accordance with the present invention but having only three corrugated side walls 15b, c, and d. A fourth substantially planar side wall 16 may be used to complete the closed section structure. This embodiment would find application in vehicle headliners and interiors as shown in FIG. 11.

Figure 14:
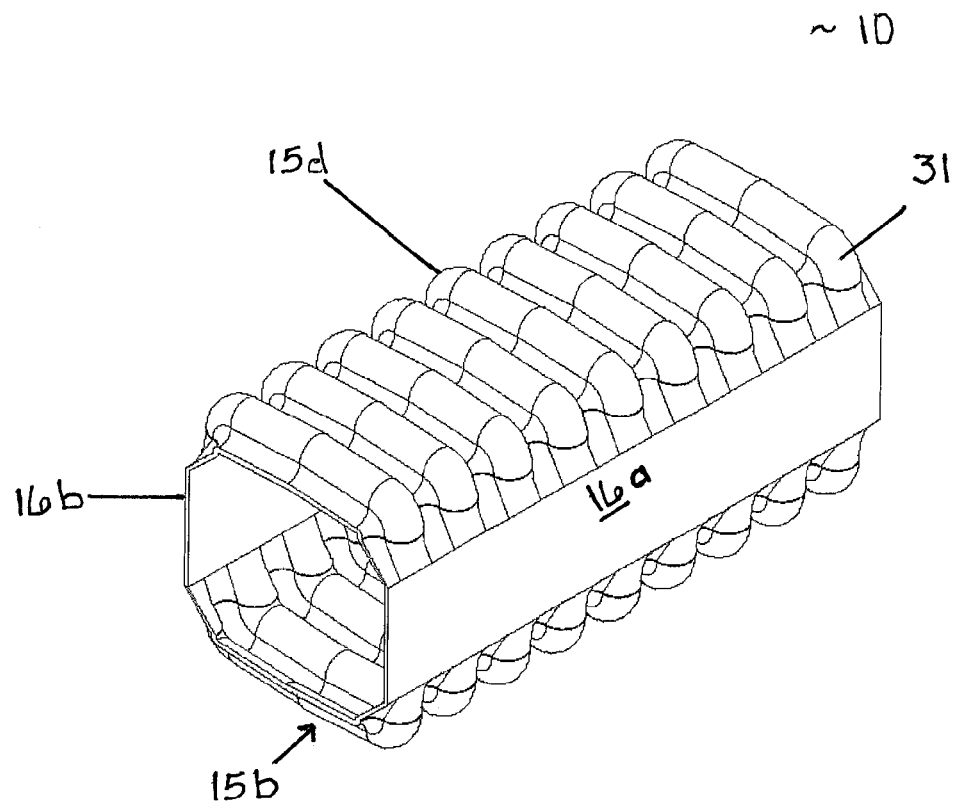
FIG. 14 is an isometric view of another embodiment of the corrugated tubular energy absorbing structure of the present invention having two corrugated walls.
Figure 15:
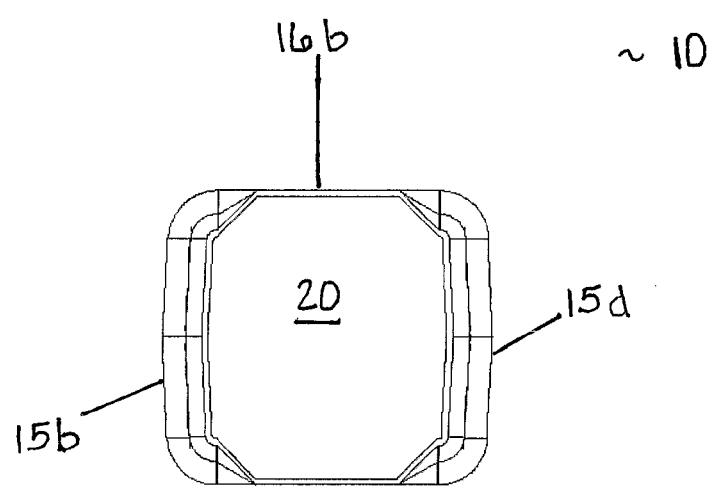
FIG. 15 is an end view of the two-wall embodiment of the energy absorbing structure shown in FIG. 14.

FIGS. 14-15 show another embodiment of a tube 10 in accordance with the present invention but having two opposed corrugated side walls 15b and d and two opposed substantially planar side walls 16a and b. This embodiment would find application in limited packaging space locations such as in vehicle interiors as shown in FIG. 11.

Figure 16:
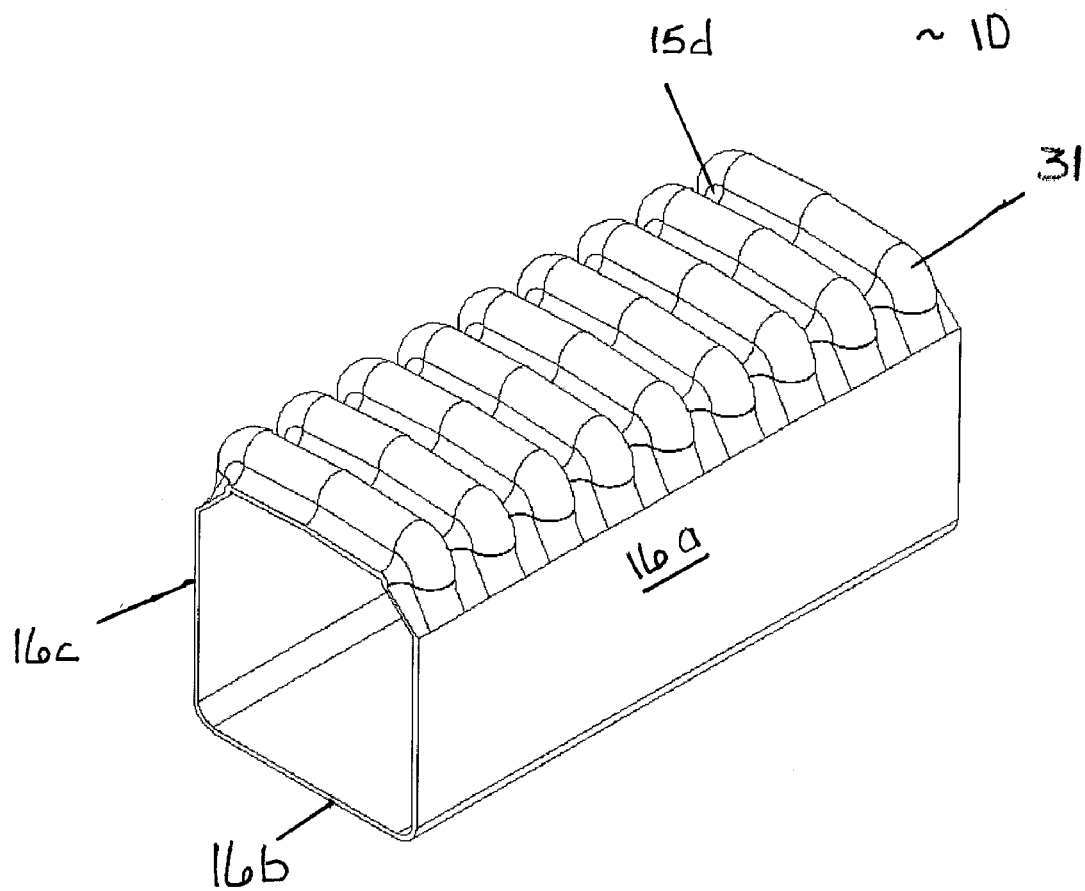
FIG. 16 is an isometric view of yet another embodiment of the corrugated tubular energy absorbing structure of the present invention having a single corrugated wall.
Figure 17:
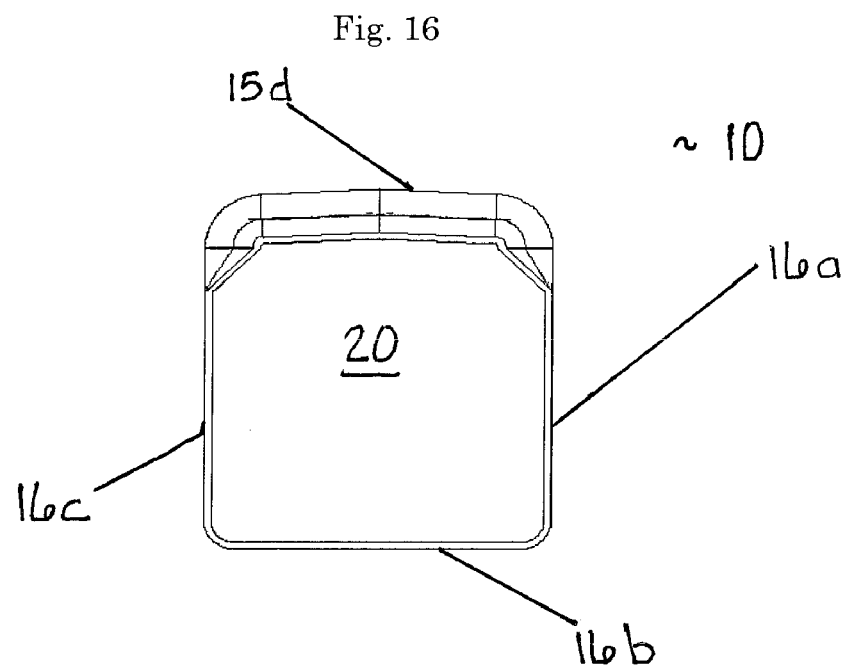
FIG. 17 is an end view of the single-wall embodiment of the energy absorbing structure shown in FIG. 16.

FIGS. 16 and 17 show yet another embodiment of a tube 10 in accordance with the present invention but having a single corrugated side wall 15d and three substantially planar side walls 16a, b and c. This embodiment would find application for vehicle exteriors wherein the planar walls are show surfaces.

Figure 18:
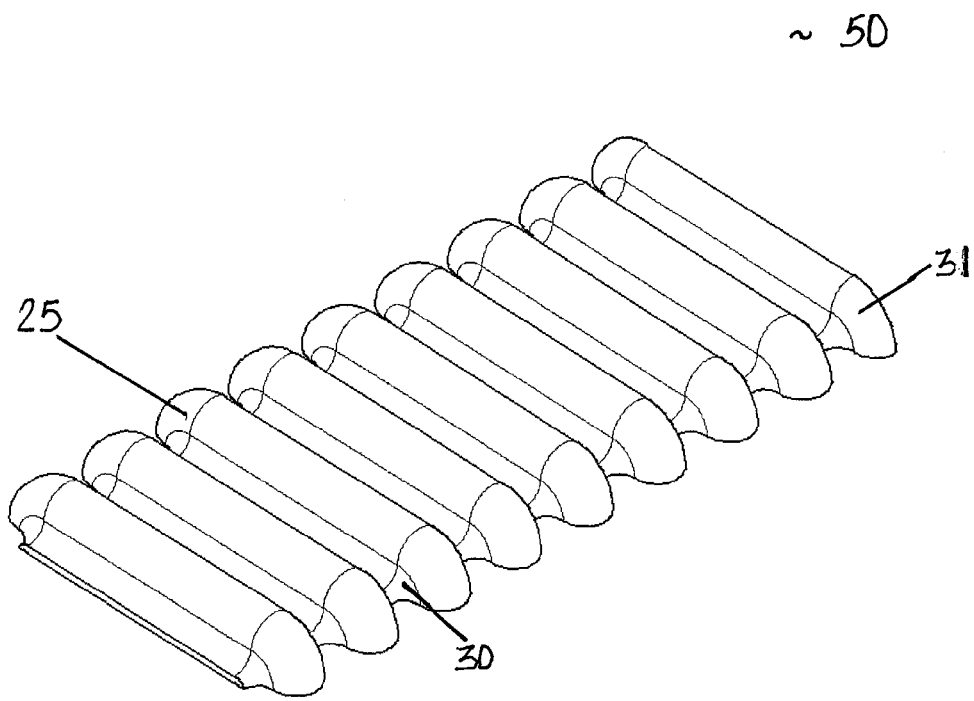
FIG. 18 is an isometric view of another embodiment of the corrugated tubular energy absorbing structure of the present invention having a single corrugated wall forming a corrugated sheet structure.
Figure 19:
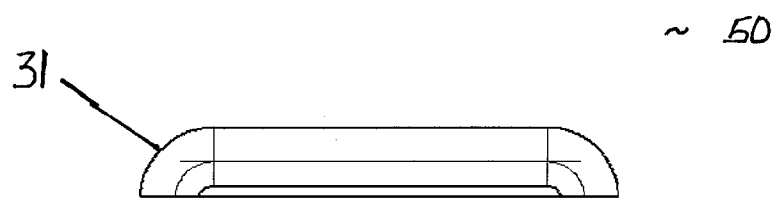
FIG. 19 is an end view of the corrugated sheet embodiment of the energy absorbing structure shown in FIG. 18.

FIGS. 18 and 19 show an embodiment of the present invention in the form of a section cut of the basic corrugated tube (as generally shown in FIGS. 4-7, for example), resulting in a corrugated sheet 50. As in other embodiments, the sheet 50 includes a series of interconnected alternating convex and concave radial corrugation surfaces 25 and 30. The corrugation surfaces 25 and 30 are transversely aligned along the length of the sheet 50 with rounded closed ends 31. This embodiment will find application in roof headliners as shown in FIG. 11.

Figure 21:
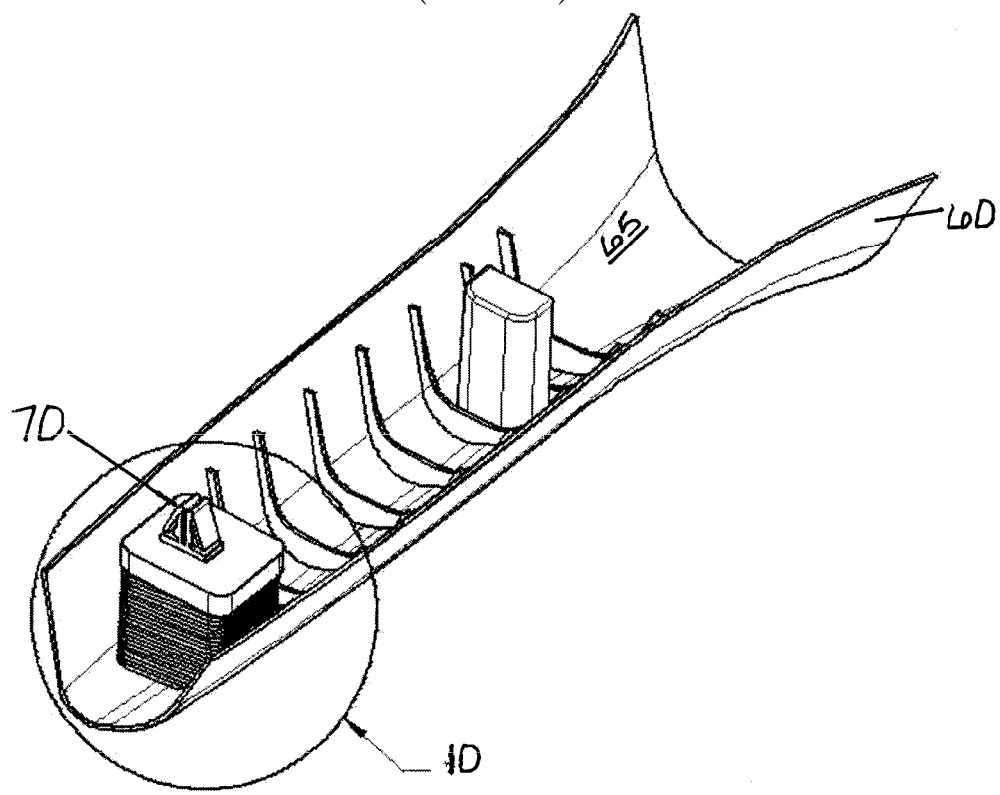
FIG. 21 is an isometric interior view of a typical motor vehicle A-pillar trim component as shown in FIG. 20, but in which the mounting clip is attached to a corrugated tubular energy absorbing structure in accordance with the present invention.

The energy absorbing structure of the present invention can be combined with a trim component used in the passenger compartment of a motor vehicle. In such an application, the energy absorbing structure can also function as a spacer for attaching the trim component to the vehicle structure. One embodiment of this combination is shown in FIG. 21. A first end of a closed section polygonal tube 10 having corrugated walls (as generally shown in FIGS. 4-7) is attached to the interior surface 65 of an automobile A-pillar trim component 60. (The structural member that supports the roof and/or vehicle windshield on either of the windshield frame is commonly referred to as the "A-pillar".) The second end of the tube 10 projects away from the surface 64. A trim mounting clip 70 is attached to the second end of the tube 10. The trim mounting clip snaps into a corresponding attachment point on the A-pillar (not shown) of the vehicle.

Figure 20:
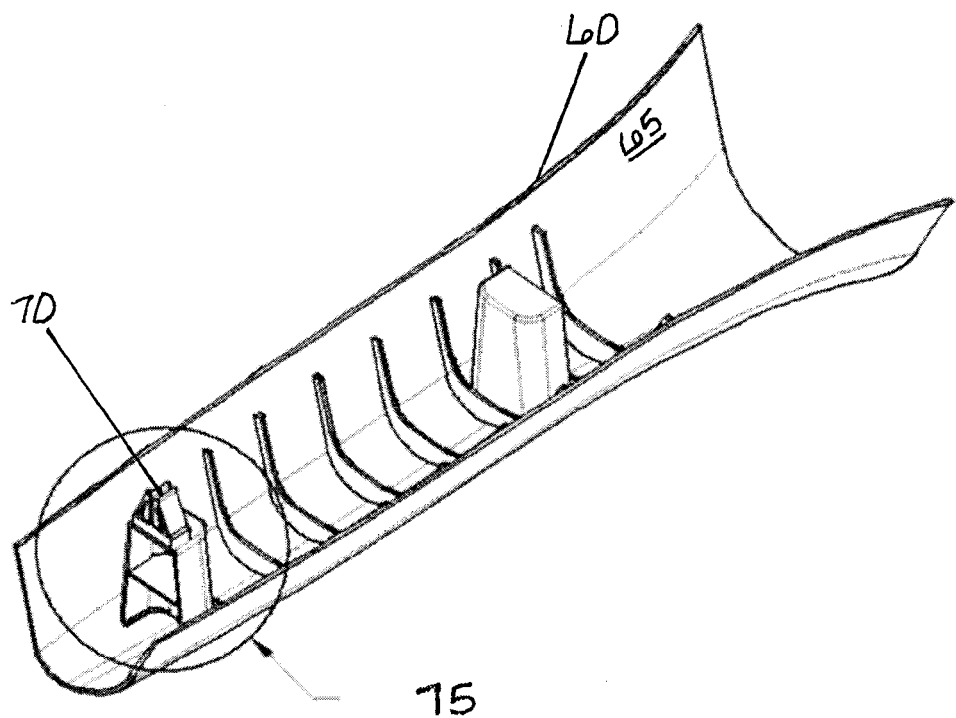
FIG. 20 is an isometric interior view of a typical motor vehicle A-pillar trim component showing a conventional injected molded clip tower.

Referring to FIG. 20, which shows a conventional A-pillar trim piece 60 and mounting clip 70, it can be seen that the energy absorbing tube 10 of the present invention replaces the conventional clip tower 75. The tube 10 in FIG. 21 is fabricated with sufficient stiffness to properly space the trim piece 60 away from the vehicle. Unlike the conventional clip tower, however, the corrugated tube 10 with optimized corrugation geometry also performs the energy absorbing functions necessary to remediate impacts with the A-pillar by vehicle occupants.

Figure 23:
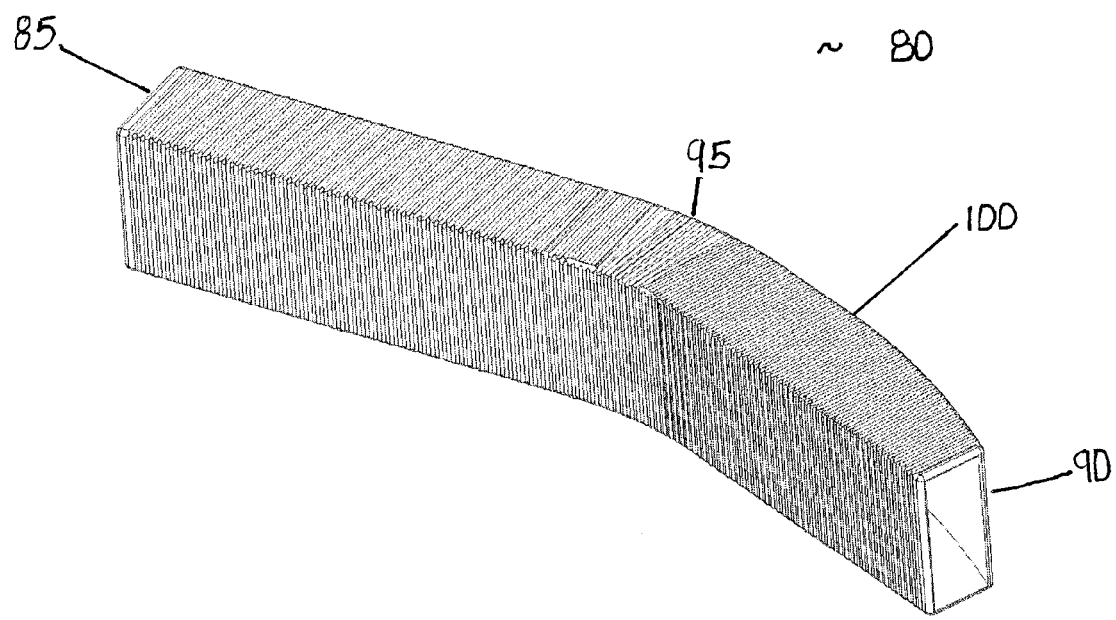
FIG. 23 is an isometric view of another embodiment of the corrugated tubular energy absorbing structure of the present invention having a variable geometric profile.

FIG. 23 shows another embodiment of the energy absorbing structure of the present invention. The structure is generally a tube 10 having a substantially quadrangular cross-section and four corrugated walls with optimized corrugation geometry (as generally shown in FIGS. 4-7). However, in the embodiment of FIG. 23, the tube 10 has a variable profile. The axis of the tube 10 changes at tube section 95. In addition, the cross-sectional area of the tube changes at tube section 100, while maintaining the same aspect ratio limit of less than or equal to 2.0. The embodiment of FIG. 23 can be used as a bumper absorber mounted between the fascia and bumper beam.

The basic corrugated tubular structure of this invention can be optimized for use in a variety of energy absorbing applications using a predictable design methodology. The method of designing a tube for efficiently absorbing impact energy in response to a constant impact force applied to a motor vehicle will typically commence with selecting a tube having a closed polygonal cross-section.

The designer should then determine nominal and maximum tube dimensions in accordance with space available in the location in the motor vehicle where the tube is to be placed. Packaging dimensions of the tube for purposes of transport and storage should also be considered at this phase of the design.

Figure 1:
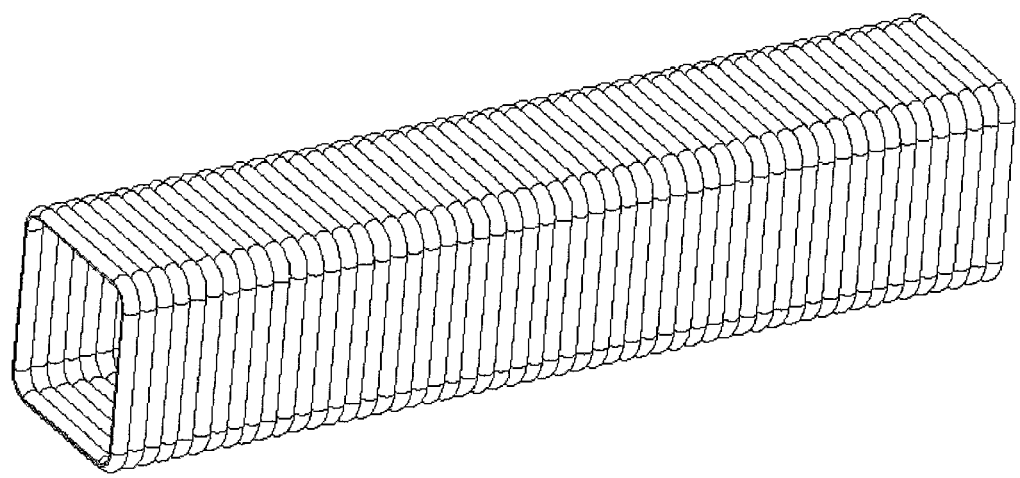
FIG. 1 is an isometric view of a conventional spin formed tubular energy absorbing body.
Figure 2:
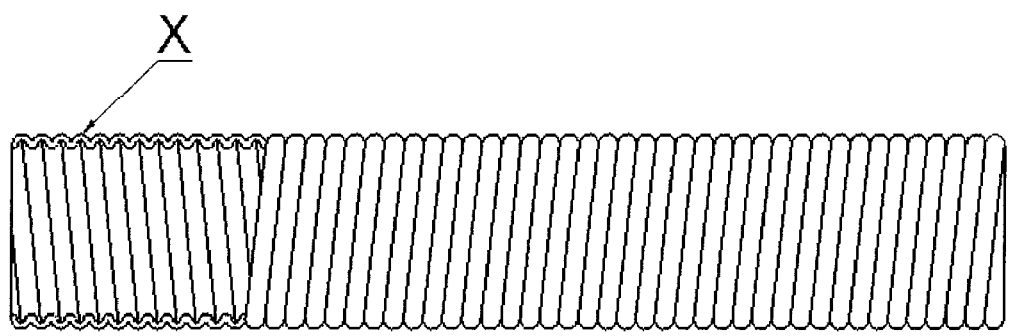
FIG. 2 is a side sectional view of the energy absorbing body of FIG. 1.
Figure 3:
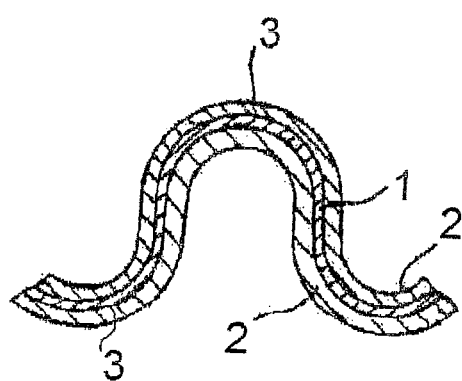
FIG. 3 is an enlarged cross-sectional view of the wall portion (X) of the energy absorbing body of FIGS. 1 and 2.
Figure 4:
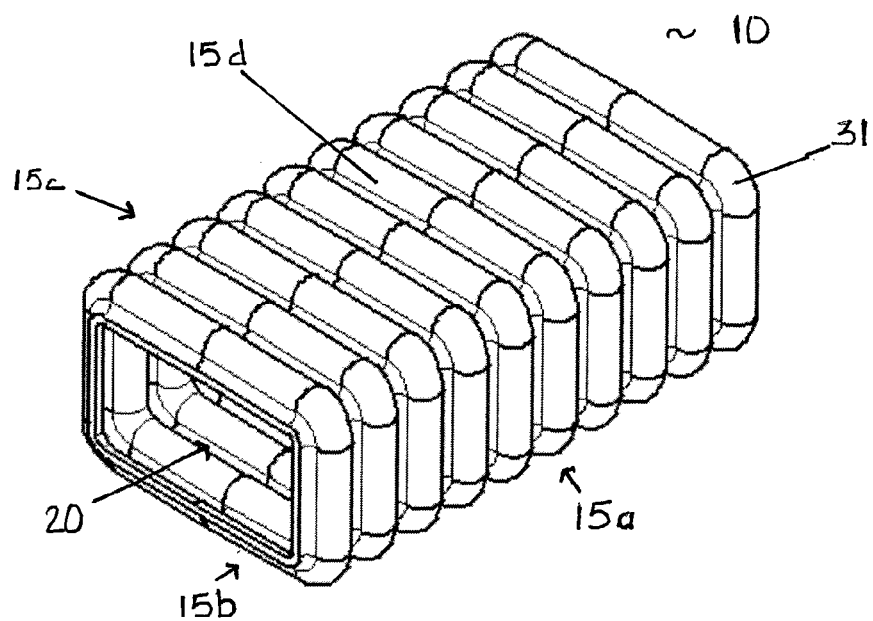
FIG. 4 is an isometric view of one embodiment of the corrugated tubular energy absorbing structure of the present invention.

For the designer, the preferred tube cross-section is substantially quadrangular with rounded corners as shown in FIG. 4, with a width (W) to length (L) ratio (L/W) less than or equal to 2.0 where L is the larger dimension. The tubular structure may deform in an unstable bucking mode if the aspect ration L/W is greater than 2.0.

The designer should then adopt a preferred corrugation geometry in which the corrugations have a constant continuous radius with few (no more than two per corrugation) or no flat sections. This geometry will result in a more uniform stress distribution and uniform progressive deformation of each corrugation during impact and energy absorption.

The preferred wall material is a metal, composite, or polymer, such as extruded HDPE, with a sufficient degree of plasticity to provide 100% or greater elongation to break.

The designer then selects the stroking dimension for a given constant force level (or acceleration level) to absorb all of the impact energy within 90% or less of the overall tube dimension. For example, the pedestrian lower leg impact test requires a peak acceleration of less than 150 G with total impact energy specified by the 40 km/hour impact velocity and the 13.3 kg mass of the leg form used in the test. As an example, for a design constant acceleration level of 120 G (3,511 LBF=15.59 K N), the basic corrugated tubular structure must deform (stroke) approximately 53 mm to absorb 100% of the impact energy. Accordingly, a tubular structure with a total dimension (L) greater than 53 mm should be selected.

The constant reaction force or acceleration level is primarily a function of the side wall corrugation geometry and wall thickness. This can be calculated by using publicly available computer simulation software such as LS_DYNA. LS_DYNA is a software program for explicit finite element analysis of non-linear dynamic response of three dimensional structures. FIGS. 22a and 22b show a typical LS_DYNA simulation of a lower leg form impact test of the basic corrugated tubular energy absorber of the present invention when mounted on a vehicle bumper. The output simulation graph shows a nearly constant acceleration level of 120 G vs. time.

The efficiency of energy absorption is determined by the ratio of the actual energy (area under the force vs. deflection curve) divided by a square or rectangular area, calculated as peak force multiplied by peak deflection. The efficiency can be optimized via using software such as LS_DYNA to iterate key input values of corrugation geometry, material, and wall thickness. Such an iterative design process will show that the basic corrugated tubular structure will produce a near perfect constant force level deformation for one or more sets of input parameters of corrugation geometry and wall thickness.

As noted above, it may be advantageous to design a corrugated tubular energy absorbing structure that can provide a range of constant force levels. This will allow a basic structural design to accommodate a range of different impact requirements and different vehicle applications. To accomplish the above, the design method may include filling the basic structure with polymer foam of varying volumes and densities. In some cases the foam density can be selected to further improve the efficiency of energy absorption.

In summary, a preferred embodiment of the method for designing an energy absorbing structure will include the following steps:

a. selecting a tube having a hollow interior and substantially quadrangular cross-section defined by a longer tube dimension L and a shorter tube dimension W;

b. providing the tube with four corrugated side walls of substantially constant material thickness t, each of the side walls having rounded corners;

c. determining nominal and maximum tube dimensions for L and W in accordance with space available in the location in the motor vehicle where the tube is to be placed;

d. predicting an energy absorbing stroke distance such that the tube will absorb all of the impact energy within a 90% or less deformation of the tube;

e. selecting one of the dimensions L and W to correspond to the predicted stroke distance;

f. selecting the other of the dimensions L and W so that the aspect ratio L/W is substantially within the limit of less than or equal to 2.0;

g. providing each of the corrugated walls with a series of interconnected transverse convex and concave corrugations having a constant continuous corrugation radius R with no or few flat sections; and h. selecting the corrugation radius R such that the shorter tube dimension W is equal N*R, where N is an integer.

The design method can further include selecting a metal, composite, or polymer wall material capable of greater than 100% elongation to break.

In accordance with preferred design method, the energy absorbing efficiency of the tube is optimized by computer modeling of tube deformation over time and deflection in response to one or more impact forces. The computer modeling should include input of iterating values for wall material thickness t and corrugation geometry including the corrugation radius R until a square wave force vs. deflection at the desired force level is achieved.

In another embodiment of the design method, the response of the tube to different magnitudes of constant impact forces can be adjusted by providing at least a portion of the interior of the tube with a volume of polymer foam having a known foam density. The volume of the foam and the foam density are then varied to accommodate different constant force levels.

Thus, although there have been described particular embodiments of the present invention of a new and useful a corrugated tubular energy absorbing structure, it is not intended that such references be construed as limitations upon the scope of this invention except as set forth in the following claims.

What is claimed is:

1. An energy absorbing structure comprising:
   a. at least one corrugated wall having a length and a width;
   b. the corrugated wall comprising a plurality of interconnected corrugations, each of the corrugations having a continuous constant radius (R) and no more than two flat spots per corrugation, with adjacent interconnected corrugations being separated by a nominal distance equal to 4*(R); and
   c. wherein the corrugations are progressively deformable in response to an impact force applied to the wall.

2. The energy absorbing structure of claim 1 wherein the corrugations comprise alternating convex and concave radial corrugation surfaces that are aligned across the width of the wall, substantially transverse to the length of the wall.

3. The energy absorbing structure of claim 2, wherein the alternating convex and concave radial corrugation surfaces are aligned along the length of the wall.

4. The energy absorbing structure of claim 1 wherein the wall is formed of one of a polymer, metal or composite material.

5. The energy absorbing structure of claim 4 wherein the wall comprises a molded material.

6. The energy absorbing structure of claim 5 wherein the wall comprises an extruded material.

7. The energy absorbing structure of claim 6 wherein the wall is formed of high density polyethylene (HDPE).

8. An energy absorbing structure comprising:
   a. a closed section polygonal tube having a length;
   b. the tube comprising at least one corrugated side wall extending along the length of the tube;
   c. the corrugated side wall comprising a plurality of interconnected corrugations, each of the corrugations having a corrugation geometry defining a continuous series of alternating convex and concave radial corrugation surfaces;
   d. wherein the corrugations are progressively deformable in response to an axial impact force applied to the tube; and
   e. wherein the tube includes a substantially quadrangular cross-section having longer and shorter outside dimensions (L) and (W) defined by the convex radial corrugation surfaces and wherein (L) and (W) define a tube aspect ratio that is less than 2.

9. The energy absorbing structure of claim 8 wherein the tube comprises high density polyethylene.

10. The energy absorbing structure of claim 8 wherein the tube has a substantially quadrangular cross-section with rounded corners.

11. The energy absorbing structure of claim 10 wherein the tube comprises four corrugated side walls defining an interior of the tube, and wherein the corrugations on each of the side walls are aligned transverse to the length of the tube.

12. The energy absorbing structure of claim 11 further comprising a foam material filling at least a portion of the interior of the tube.

13. The energy absorbing structure of claim 11 further comprising one or more fasteners attached to and projecting from at least one of the corrugated side walls.

14. The energy absorbing structure of claim 13 wherein a projecting portion of the fastener is adapted for removable attachment of the energy absorbing structure to a motor vehicle trim/fascia component.

15. The energy absorbing structure of claim 10 wherein the tube comprises three corrugated side walls.

16. The energy absorbing structure of claim 10 wherein the tube comprises two corrugated side walls.

17. The energy absorbing structure of claim 10 wherein the tube comprises a single corrugated side wall.

18. The energy absorbing structure of claim 11 wherein the tube has a cross-sectional profile that varies from a first end of the tube to a second end of the tube.

19. The energy absorbing structure of claim 18 wherein the tube has an axis that deviates from the first end of the tube to the second end of the tube.

20. A device for absorbing energy from an impact force applied to a motor vehicle comprising:
   a. an elongated tube formed of a material with greater than 100% elongation to break;
   b. the tube comprising a closed polygonal section with corrugated side walls defining a tube axis;
   c. the tube positioned in the motor vehicle to receive an axial impact force;
   d. the corrugated walls comprising corrugations defined by a continuous series of alternating convex and concave radial corrugation surfaces aligned transversely to the tube axis;
   e. the corrugations are further defined by corrugation parameters selected such that the energy absorbing device provides a substantially constant reaction force in response to an axial impact force by uniform and progressive deformation of the corrugations; and
   f. wherein the selected corrugation parameters define corrugations having a constant continuous radius with no more than two flat sections per corrugation.

21. The energy absorbing device of claim 20 wherein the selected corrugation parameters further include longer and shorter outside dimensions (L) and (W) defined by the convex radial corrugation surfaces, and wherein (L) and (W) define a tube aspect ratio that is no larger than 2.0.

22. The energy absorbing device of claim 21 wherein the selected corrugation parameters further include convex radial corrugation surfaces having a radius (R) and the shorter outside dimension (W) of the tube cross-section is defined by (N)*(R), where (N) is an integer.

23. The energy absorbing device of claim 22 wherein the selected corrugation parameters further include successive aligned convex radial corrugation surfaces on the side walls separated by a nominal distance substantially equal to 4*(R).

24. The energy absorbing device of claim 23 wherein the selected corrugation parameters further include the corrugated side walls having a substantially uniform material thickness.

25. The energy absorbing device of claim 24 wherein the selected corrugation parameters further include the concave radial corrugation surfaces having a radius substantially equal to the radius of the convex radial corrugation surfaces, thereby defining a nominal corrugation depth equal to 2*(R).

26. An energy absorbing structure comprising:
   a closed section polygonal tube having a length;
   the tube comprising at least one corrugated side wall extending along the length of the tube;
   the corrugated side wall comprising a plurality of interconnected corrugations, each of the corrugations having a corrugation geometry defining a continuous series of alternating convex and concave radial corrugation surfaces;
   wherein the corrugations are progressively deformable in response to an impact force applied to the tube;
   wherein the tube has a substantially quadrangular cross-section with rounded corners;
   wherein the tube comprises four side walls defining an interior of the tube, and wherein the corrugations on each of the side walls are aligned transverse to the length of the tube; and
   wherein the substantially quadrangular cross-section of the tube has longer and shorter outside dimensions (L) and (W) defined by the convex radial corrugation surfaces and wherein (L) and (W) define a tube aspect ratio that is less than 2.

27. The energy absorbing structure of claim 26 wherein the tube aspect ratio is approximately in a range from 1.0 to 2.0.

28. The energy absorbing structure of claim 27 wherein each of the convex radial corrugation surfaces has a radius (R) and the shorter outside dimension (W) of the tube cross-section is defined by (N)*(R) where (N) is an integer.

29. The energy absorbing structure of claim 28 wherein successive aligned convex radial corrugation surfaces on the side walls are separated by a nominal distance substantially equal to 4*(R).

30. The energy absorbing structure of claim 29 wherein the corrugated side walls have a substantially uniform material thickness, and the concave radial corrugation surfaces have a radius substantially equal to the radius of the convex radial corrugation surfaces, thereby defining a nominal corrugation depth equal to 2*(R).

* * * * *